United States Patent [19]

Schmidt

[11] 4,408,339
[45] Oct. 4, 1983

[54] COMPACT X-RAY UNIT

[75] Inventor: Gunter Schmidt, Malibu, Calif.

[73] Assignee: Xonics, Inc., Des Plaines, Ill.

[21] Appl. No.: 233,995

[22] Filed: Feb. 12, 1981

[51] Int. Cl.[3] ............................................. G03B 41/16
[52] U.S. Cl. .................................... 378/173; 378/210
[58] Field of Search ................................ 378/173, 181

[56] References Cited

U.S. PATENT DOCUMENTS

| | | | |
|---|---|---|---|
| 4,019,061 | 4/1977 | Finkenzeller | 378/173 |
| 4,260,896 | 4/1981 | Schmidt | 378/173 |
| 4,282,439 | 8/1981 | Matsuura | 378/173 |

Primary Examiner—Craig E. Church
Attorney, Agent, or Firm—Freilich, Hornbaker, Wasserman, Rosen & Fernandez

[57] ABSTRACT

A chest X-ray unit is provided which is of compact design and which can be easily utilized. The apparatus includes an exposure station at the front where a film sheet can be tightly held between a pair of intensifier screens, a supply station behind the exposure station for receiving a film cassette and feeding one sheet at a time into the exposure station, and a receiving cassette at the back of the apparatus for receiving one exposed sheet at a time for later developing. A film sheet is moved in a loop from the supply cassette to the exposure station by a pair of input rollers that move the sheet upwardly into a curved guide that extends in a half circle, and by a pair of output rollers at the end of the loop for feeding the sheet downwardly. The output rollers move slightly faster than the input rollers to prevent the middle of the film sheet from scraping against the guide. A feedout roller which feeds a sheet out of the supply cassette into the input rollers, is coupled through an overrunning clutch to a motor, so that the feedout roller can move a sheet upwardly until it is caught between the input rollers, and the input rollers then can pull the sheet slightly faster than it is moved by the feedout roller. The film dropping between the intensifier screen members is caught by a pin that is later jerked upwardly as it is withdrawn.

8 Claims, 7 Drawing Figures

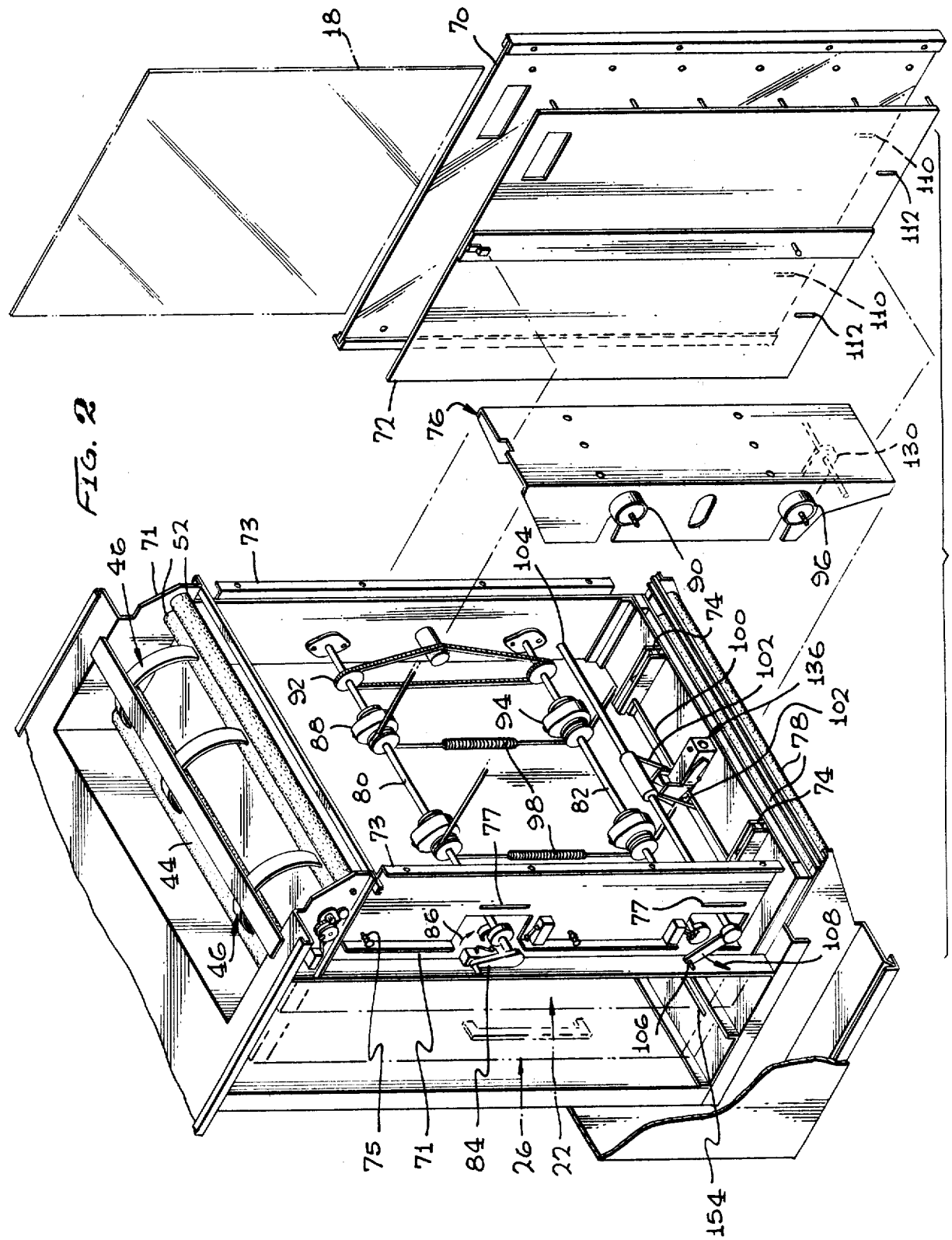

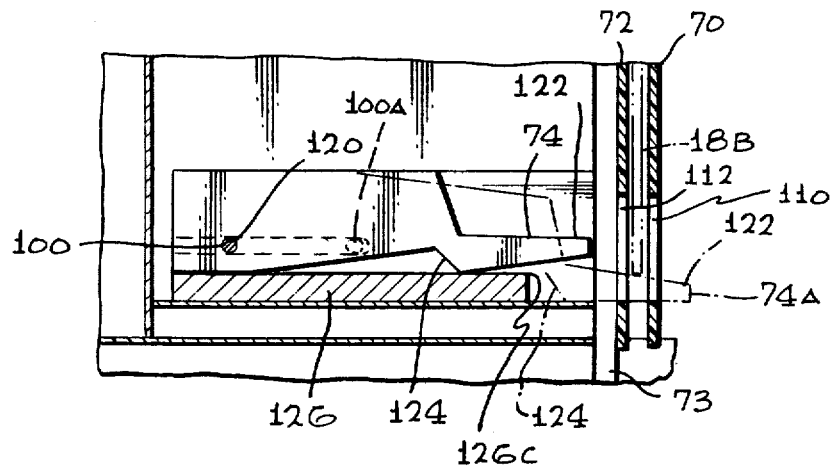
FIG. 5
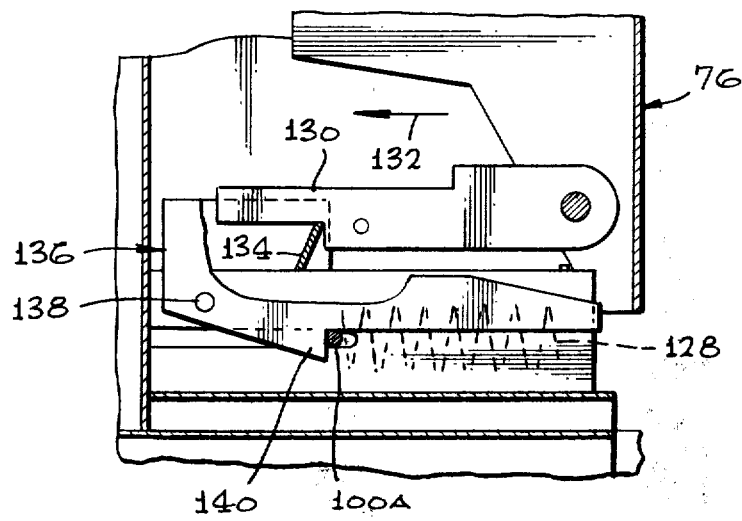
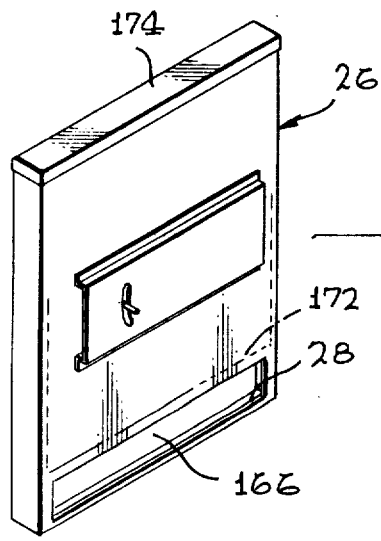
FIG. 6
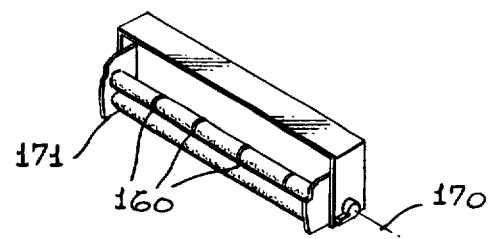
FIG. 7

COMPACT X-RAY UNIT

BACKGROUND OF THE INVENTION

A chest X-ray unit typically includes an exposure station having a pair of intensifier screen members that receive a film sheet between them. While older units require individual hand loading and unloading of a sheet between the intensifier screen members, greater efficiency can be obtained by utilizing a supply film cassette to supply one film sheet at a time, and a loading mechanism for automatically loading the sheet between the intensifier screen members in a daylight environment. Further efficiency can be obtained by utilizing a receiving cassette to automatically receive and store each film sheet after it has been exposed. The simplest arrangement is to position the supply cassette above the exposure unit and the receiving cassette below it, so that sheets can drop by gravity from the supply station to the exposure station and then to the receiving station. However, such an arrangement results in a tall structure that is cumbersome to move up and down to the height of a patient's chest, and which interferes with the movement of patient-holding gurneys or other equipment in the floor area under the apparatus. An X-ray system of moderate height which incorporated automatic supply and/or receiving cassette stations, would greatly enhance the acceptability of labor-saving X-ray systems.

SUMMARY OF THE INVENTION

In accordance with one embodiment of the present invention, a compact X-ray system is provided which facilitates the loading and unloading of film. The system includes an exposure station where a film sheet can be pressed between intensifier screen members during exposure, a supply station where a cassette containing many unexposed film sheets can be stored, and a receiving station where many exposed films can be received for developing. The system can be made compact by positioning the supply and receiving stations at different depths behind the exposure station, but with the different stations lying in substantially parallel planes, and by utilizing guides that guide individual sheets in movement along loop-like paths.

A guide apparatus for moving a sheet in a loop path between the exposure station and the supply and/or receiving station, can include a guide member extending in a half circle to guide the leading edge of a sheet into a loop path, and pairs of rollers at opposite ends of the loop. A pair of output rollers at the output end of the loop path are driven slightly faster than a pair of input rollers at the input end of the path, so that only the leading edge of the film sheet rubs on the half-circle guide, while the middle of the sheet is pulled away from rubbing contact with the guide. A supply cassette includes a feed-out roller that feeds a sheet into the pair of input rollers that move it into the loop. A drive mechanism turns the feed-out roller slightly slower than the input rollers, and includes an overrunning clutch that permits the input rollers to pull the film sheet while the feed out roller turns like an idling roller.

The exposure station includes a pair of pins that project through slots in the bottom of a pair of intensifier screen members, to support the lower edge of a film dropped between the screen members. After the screen members are pressed tightly against the film sheet, the film is exposed, and the members are moved apart, the pins are withdrawn to permit the film sheet to drop down from between the screen members. During retraction of the pins, they are also jerked upwardly, to loosen the film so as to prevent it from sticking to either of the screen members.

The receiving station includes a pair of rotatably mounted members, such as a roller and a belt that partially wraps about the roller, to move a film sheet upwardly into the receiving cassette while also bending the film. As the trailing edge of the film sheet passes the rotatable members, the film sheet snaps back towards a straight position, which causes it to neatly stack against film sheets already in the cassette.

The novel feature of the invention are set forth with particularity in the appended claims. The invention will be best understood from the following description when read in conjunction with the accompanying drawings.

BRIEF DESCRIPTION OF THE DRAWINGS

FIG. 4 is a view taken on the line 4—4 of FIG. 3.

FIG. 5 is a view taken on the line 5—5 of FIG. 4, but with solid lines showing the pin mechanism in a retracted configuration.

FIG. 6 is a view taken on the line 6—6 of FIG. 4.

FIG. 7 is a partial exploded perspective view showing portions of the receiving station of the apparatus of FIG. 3.

DESCRIPTION OF THE PREFERRED EMBODIMENT

Figure 1:
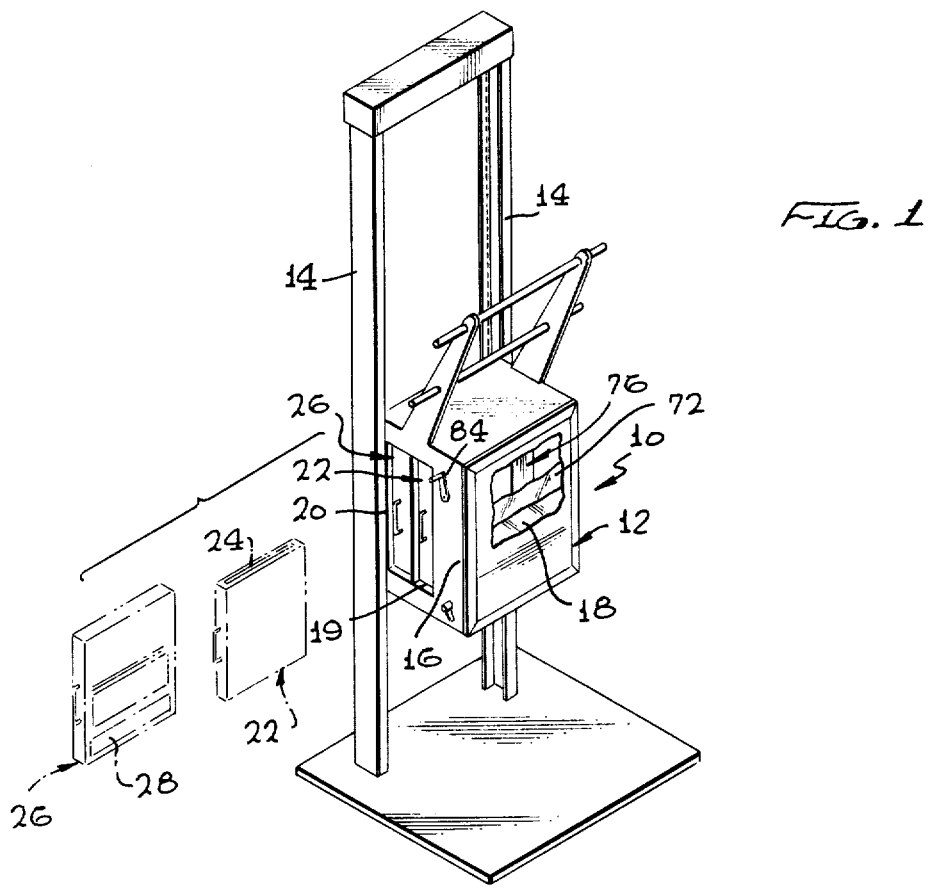
FIG. 1 is a perspective view of a chest X-ray system constructed in accordance with the present invention.

FIG. 1 illustrates an X-ray system 10 which includes a compact unit 12 that can be moved vertically along rails 14. The unit includes an exposure station 16 near the front where a film sheet 18 lies for exposure by X-rays passing through the chest of a patient. A supply station 19 lies facewise behind the exposure station 16 to hold a group of unexposed film sheets, while a receiving station 20 lies facewise behind the supply station to receive film sheets that have been exposed. By facewise behind, it is meant that the large film sheets 18 lie in substantially parallel planes at the two stations. A technician can set up the unit by inserting a film supply cassette 22 into the supply station 19, the cassette 22 having an exit opening 24 through which it feeds individual sheets of film for movement to the exposure station 16. The technician will also install a receiving cassette 26 in the receiving station 20, with the receiving cassette opening 28 positioned to receive exposed film sheets.

Figure 3:
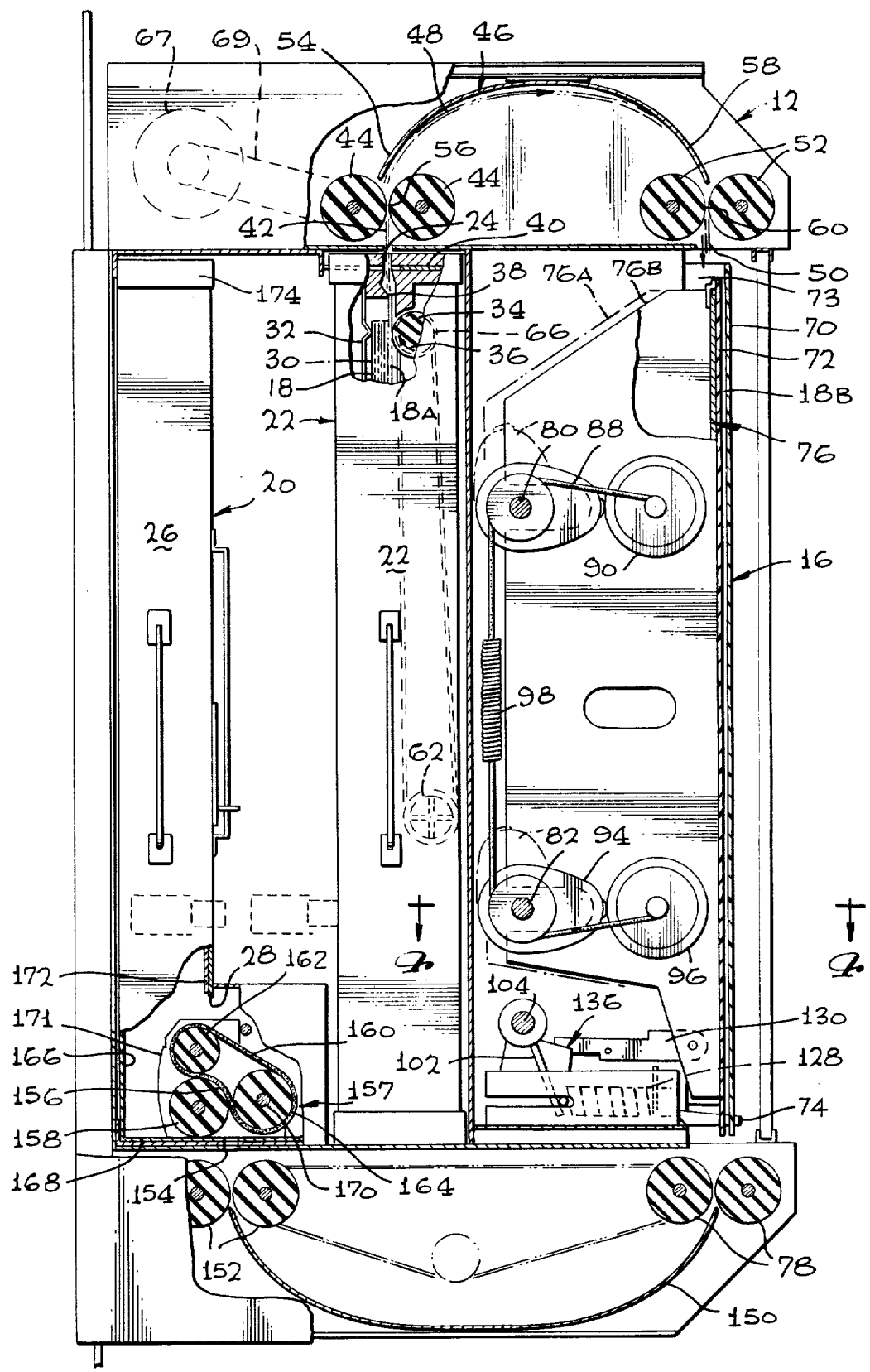
FIG. 3 is a partially sectional side view of the system of FIG. 2.

As shown in FIG. 3, the supply cassette 22 includes a stack 30 of unexposed X-ray film sheets 18 lying in substantially vertical planes. The upper end of the stack is pressed at one face by a pressure plate 32 so that a sheet at 18A at the other face of the stack presses against a feed-out roller 34. The feed-out roller can be driven in the direction of arrow 36 to feed the sheet at 18A past a knife edge 38 and past an open cover 40 along a first upward path portion 42. The upwardly-moving sheet 18A is caught between a pair of input rollers 44 which move the sheet upwardly unitl it engages a group of loop guides 46. The loop guides 46 extend in substantially a half circle to guide the film sheet in movement along an intermediate path portion 48 in the shape of a loop and which is shorter than the length of a film sheet. The loop guides direct the film sheet from its initial path portion 42 to another path portion 50 leading to the exposure station 16, with the path portions 42, 50 lying in substantially parallel planes that are spaced from one another.

As the film sheet is pulled upwardly by the input rollers 44, the leading edge of the film sheet engages the film guides 46, and the film guides direct the leading edge of the sheet along the loop path 48. When the leading edge of the sheet has moved along a substantially 180° curve, it is engaged by a pair of output rollers 52 which direct the sheet downwardly along the path portion 50 to the position 18B where the sheet can be exposed. It can be seen that each of the film guides 46 has an input end 54 extending so an imaginary extension of the input end 54 lies behind the nip 56 of the input rollers where they engage the film sheet, to intercept the leading edge of the sheet. The output end 58 of each loop guide extends in a direction so that an imaginary extension of the end 58 almost intercepts the nip 60 of the output rollers 52, to direct the leading edge of the film sheet into the nip 60.

While the frictional engagement of the leading edge of the film sheet with the group of guides 46 is permissible, it is undesirable to permit middle portions of the film sheet to engage the film guides 46 because this could cause scratching of the film emulsion. To avoid this, the output rollers 52 are driven at a slightly faster peripheral speed than the input rollers 56. As a result, after the leading edge of the film sheet has been engaged by the output rollers 52, the portion of the film sheet which lies within the film guides 46 becomes progressively more flatened so that it gradually draws further away from the loop guides 46. Of course, if the film sheet were very long or the output rollers were driven much faster than the input rollers 44, then the film sheet would eventually become taut and one set of rollers would slip against it and damage the emulsion. This is easily avoided by driving the output rollers 52 at only a slightly faster speed than the input rollers. In one X-ray unit that has been constructed with relative dimensions as shown in the figures, the output rollers 52 were driven at a speed which was about 20% greater than that of the input rollers.

In the movement of a film sheet at 18A along the first path portion 42, it is desirable that the input rollers 44 move the film faster than the feed-out roller 34, to prevent buckling of the film sheet. To permit this, the feed-out roller 34 is driven through an overrunning clutch 66 that can drive the roller 34 in the direction of arrow 36, but which permits the roller to turn more rapidly in the direction of arrow 36 than it is being directly driven. The supply cassette 22 has an exposed rotor 62 at one side which can be driven by a motor within the unit 12. The rotor 62 is connected by a chain 64 in the cassette to an overrunning clutch 66 which is connected to the feedout roller 34, to permit the roller to be turned faster than it is driven. The exposed rotor 62 and the rollers 44, 52 are driven by a motor and transmission means which includes a motor 67 and chain belts 69.

Prior to the film reaching the second path portion 50, a pair of intensifier screen members 70, 72 must be separated to receive the film sheet between them so the sheet can move to the film sheet position 18B. With the screen members separated, the film sheet can be moved along the loop path 48, and down along the second path portion 50. The sheet moves down as it drops between the intensifier screen members 70, 72 and is stopped in its downward movement by a pair of pins 74 which extend through slots in the screen members. A backing member 76 behind the screen member 72 is then moved forwardly from the position 76A to the position 76B, to push the rearward screen member 72 firmly against the film sheet 18B. This assures intimate contact between the film sheet and the two screen members, which is necessary to enable the screen members to intensify the image on the film. After the film has been exposed, the backup member 76 is retracted and the pins 74 are retracted, to permit the film sheet at 18B to fall down and become engaged by another set of rollers 78 that move the exposed film sheet to the receiving station.

The screen members 70, 72 (FIG. 2) are mounted at their opposite side edges on a pair of brackets 73 that have rearward portions pressed against the housing or frame 71 of the unit by spring 75. A pair of slots 77 at middle portions of the brackets receive vertically-extending keys 79 (FIG. 4) on the frame that permits the brackets to tilt about vertical axes while preventing the brackets from moving up and down or forward and backward.

Figure 2:
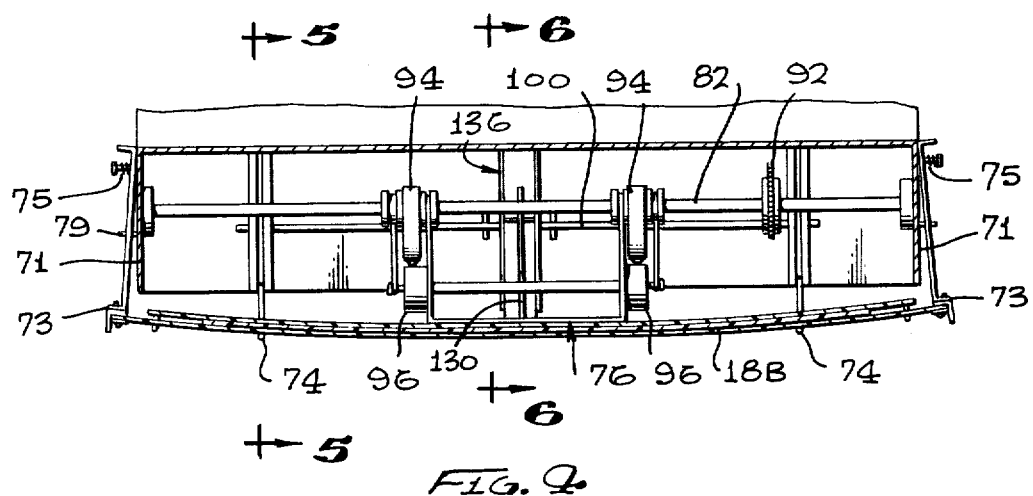
FIG. 2 is an exploded perspective view of the system of FIG. 1, showing details of the exposure station thereof.

As also shown in FIG. 2, the back-up member 76 which can push the rearward screen member 72, is slidably mounted on a pair of shafts 80, 82. When a technician moves a handle 84 in the direction of arrow 86, a pair of cams 88 on the shaft 80 press against a pair of rollers 90 on the back-up member to slide it forward. A chain 92 connects the upper and lower shafts 80, 82 so that another pair of cams 94 on the lower shaft press against a corresponding pair of bearings 96 on the backup member to move the lower portion thereof in a forward direction. When the shafts 80, 82 move in the opposite direction to withdraw the cams 88, 94, a pair of springs 98 attached to the back-up member 76 retract it.

The pins 74 which can stop the falling film sheet, are pivotally mounted on a rod 100 that is engaged by camming arms 102 extending from a shaft 104. When a pin-operating handle 106 is moved in the direction of arrow 108 to turn the shaft 104, the bar 100 moves forward and advances the pins 74 so that they project through aligned slots 110, 112 in the screen members 70, 72 to lie in the path of the falling film sheet 18.

As mentioned above, the exposed film sheet is removed by separating the intensifier screen members 70, 72 and withdrawing the pins 74 from the slots in the screen members, to permit the film sheet to fall down until it is engaged by a pair of driven rollers. One problem that can arise is that the film sheet may stick to one of the screen members 70 or 72, due to the large area of tight facewise contact engagement which is required during exposure of the film sheet. To prevent such sticking, the pins 74 are not only withdrawn from a position beneath the film sheet, but are also jerked upwardly as they are withdrawn, to forcefully lift the film sheet and immediately thereafter permit it to drop free of the pins. FIG. 5 shows a pin in the retracted position 74 and also in the extended position at phantom lines 74A. The pin has a hole 120 near its rearward end which receives the rod 100, so that the front of the pins tends to fall down, and in fact, moves down to the position 74A when the rod is moved forward to the position 100A. At the position 74A, a front portion 122 of the pin lies near the bottom of the slots 110, 112 of the screen members to support the film at 18B. When the rod at its forward position 100A is retracted to retract the front portion 122 of the pin, an inclined cam follower surface 124 on the pin engages a corner-like camming surface 126C on a pin support 126 so that the front of the pin pivots upwardly as it is withdrawn. The rod 100A is retracted rapidly under the force of a spring 128 (FIG. 3) so that the pin 74 retracts rapidly and therefore its front portion 122 rises rapidly to provide an upward jerk to the film sheet at 18B. By the time the front of the pin has withdrawn from the vertically-elongated slots 110, 112, the film sheet which is raised from the location 18B, begins dropping and can fall down from between the screen members.

In order to assure that the pin will be retracted only after the screen members have been separated, a release bar 130 (FIG. 6) is provided to release the pin-moving rod at 100A after the backup member 76 has been moved rearwardly. Rearward movement, in the direction of arrow 132, of the release bar 130, causes it to press rearwardly on a portion 134 of a catch 136 that is pivotally mounted at 138. Pivoting of the catch 136 causes a catch portion 140 to lift up and permit the rod at 100A to move rearwardly under the force of the spring 128.

Referring again to FIG. 3, it can be seen that the film sheet which is moving down from the exposure station at position 18B, is caught by the input rollers 78, moved in a loop by another set of guides 150, and then moved upwardly by another pair of output rollers 152. The output rollers 152 are driven to rotate at a slightly greater peripheral speed than the input rollers 78. The film passes upwardly through an entrance opening 154 in the receiving station 20 and into a squeeze region or nip 156 formed between a roller 158 and a belt 160 of a receiving transport. The roller 158 and belt 160 form a pair of close rotatable film-engaging devices that not only engage the film sheet to move it, but which also bend the film sheet. The roller 158 and belt 160 are positioned to direct the film sheet which is initially moving upwardly through the entrance opening 154, sidewardly through the opening 28 in the enclosure of the receiving cassette 26, and towards a rearward wall 166 of the cassette.

The leading edge of a film sheet exiting from the nip 156 between the roller 158 and belt 160, extends at an upward-rearward incline, so that the leading edge of the film sheet entering the cassette engages the rearward wall 166 of the cassette. As the film sheet is moved, its leading edge moves upwardly along the receiving cassette until the trailing edge of the film sheet reaches the end of the nip 156. The flexible and resilient film sheet then can straighten, and its bottom portion will snap away from the nip 156. As the film sheet snaps into its straight configuration, it falls down from the height of the top of the nip 156 down to a bottom wall 168 of the cassette. As the leading edge of each subsequent film sheet enters the cassette, its leading edge engages the previous film sheet instead of the rearward wall 166, but the subsequent film sheet is moved in a similar manner so that it moves upwardly until its bottom portion snaps straight, and then falls down against the bottom wall 168 of the cassette. In this way, a number of film sheets are neatly stacked in a vertical stack within the receiving cassette. While the transport 157 includes a belt 160 (and additional parallel belts) partially wrapped about roller 158, it would be possible to utilize a plurality of rollers lying on different axes to bend the film sheet about roller 158.

It would be possible to incorporate the receiving transport 157, which includes the roller 158 and belt 160, in the receiving cassette 26, but this would result in a large bulge at the bottom of the cassette that would detract from easy handling of the cassette. To avoid this, the transport mechanism 157 is constructed so that it can be pivoted about an axis 170 to move out of the opening or aperture 28 formed in the housing or container of the receiving cassette. The mechanism includes a bracket 171 which rotatably supports the rollers 158, 162, 164 and which can move into and out of the aperture 28 by pivoting the bracket about axis 170. When the receiving cassette is to be removed and the transport mechanism has been moved out of the cassette opening 28, a cover 172 in the cassette is lowered to close the opening and prevent the entrance of light. It may be noted that a separate cover 174 is provided at the top of the receiving cassette to facilitate the removal of film sheets in a dark room.

Thus, the invention provides an X-ray system which is compact and yet which facilitates the rapid loading and unloading of film sheets. A compact arrangement is achieved by locating a supply station containing numerous unexposed film sheets, and a receiving station that can receive numerous exposed film sheets, behind the exposure station and with the sheets at all three stations lying in substantially parallel planes. A mechanism for moving a sheet in a loop path between a pair of stations includes guides extending in substantially a half circle and sets of rollers at opposite ends of the guides, with the rollers at the entrance or input end rotating slightly slower than the rollers at the opposite or output end, so that only the leading and trailing edges of the film sheet contact the curved guide. A pair of pins located at the exposure station to limit downward movement of a film sheet dropped between a pair of screen members, is jerked upwardly as it is withdrawn, to free the film sheet from sticking contact with the screen members and assure that the film sheet will reliably drop when released. A receiving station includes a transport mechanism that bends the film sheet while directing it upwardly, so that when the trailing edge portion of the sheet passes the transport mechanism the film sheet snaps straight and falls down to neatly stack against prior sheets.

Although particular embodiments of the invention have been described and illustrated herein, it is recognized that modifications and variations may readily occur to those skilled in the art and consequently, it is intended that the claims be interpreted to cover such modifications and equivalents.

I claim:
1. An X-ray system comprising:
a supply cassette which includes a feedout roller;
an exposure unit;
means for guiding a film sheet along a path between said cassette and said exposure unit;
a pair of transport rollers disposed along said path to grip a film sheet between them;
motor and transmission means coupled to said rollers to turn them;
said transmission means constructed to turn said transport rollers at a faster peripheral speed than said feedout roller, and said transmission means including an overrunning clutch means which enables said feedout roller to be rotated by a film pulled thereby at a greater speed than said transmission tends to rotate said feedout roller, whereby to permit a film engaged by both feedout and transport rollers to be smoothly moved between them.

2. An X-ray film exposing apparatus comprising:

an intensifier screen assembly including a pair of largely vertical screen members;

means for moving said screen members apart to receive a film sheet, and then together to hold the film sheet tightly between them, said members having aligned slots near their lower ends;

a film support pin;

means for moving said pin through said slots to limit downward movement of an unexposed film sheet dropped between said screen members, and for later retracting said pin to allow an exposed film sheet to drop down from between said screen members;

said pin moving means being constructed to rapidly raise said pin substantially at the time it is retracted, whereby to loosen the film sheet from sticking to a screen member.

3. The apparatus described in claim 2 wherein:

said pin has a primarily horizontally extending forward portion for projecting through said slots in said screen members, and an inclined surface behind said forward portion;

said means for moving said pin includes a first element pivotally supporting said pin, means for moving said first element toward and away from said screen members, and a pin support positioned to engage said inclined surface on said pin to pivot said pin in a direction to raise its forward portion when the pin is retracted.

4. An X-ray film exposure apparatus comprising:

a housing having a forward portion and opposite sides;

an intensifier screen assembly mounted at the forward portion of said housing, including forward and rearward screen members lying facewise adjacent to each other to hold a film sheet between them, at least said forward member being flexible;

means for supporting first and second opposite edges of said forward screen member to said housing;

means mounted on said housing for pressing said rearward screen member toward said forward member to press tightly against a film sheet between them, and for releasing such pressure to permit the withdrawal of the film sheet and insertion of a new one;

said means for supporting said edges of said forward screen member including a pair of brackets, each bracket having a forward part connected to an edge of said forward member, a rearward part lying beside a side of said housing and biased toward the other bracket, and a middle portion;

the middle portion of each bracket having at least one vertically-extending slot and each side of said housing having a vertically-extending key projecting into the bracket slot to pivotally support it.

5. An X-ray system for guiding a film sheet of predetermined length and stiffness comprising:

a film supply station which includes an exit opening and means for feeding one X-ray film sheet at a time along a first path portion through said opening;

an exposure station which includes second means for receiving a film sheet moving along a second path portion, said station positioned so that sheets at said first and second path portions are spaced substantially facewise from each other;

guide means for guiding a film sheet in movement along an intermediate path portion which is of a length less than the length of said sheet and which extends in a loop between said first and second path portions, including at least one guide extending in a curve of approximately a half circle with an input end portion positioned to intercept the leading edge of a film moving along said first path portion and an output end portion positioned substantially in line with said second path portion;

a pair of input rollers positioned between said exit opening and said guide, and forming a feed nip to engage and move said film sheet;

a pair of output rollers positioned between the output end of said guide and said exposure station, and forming an output nip to engage and move said film sheet; and motor means coupled to said input and output rollers for turning them so that said output rollers move at a greater peripheral speed than said input rollers.

6. The system described in claim 5 wherein:

said guide is positioned so that an imaginary line tangent to the input portion of said guide lies a first distance to one side of said feed nip, while a second imaginary line tangent to the output portion of said guide lies closer to said output nip than said first distance.

7. A film receiver comprising:

walls forming a receiving enclosure with lower and upper end portions and with a largely vertically-extending rear wall, said enclosure having an opening in said lower end portion for receiving a film sheet;

a film transport which includes a pair of close rotatable film engaging devices formed to bend the portion of a sheet passing between them and direct the leading edge of the sheet upwardly and toward said rear wall;

a first of said film engaging devices includes a first roller, and the second of said devices includes a pair of second rollers and a belt extending between them with said second rollers located so the belt wraps partially about said first roller to hold a film sheet between the belt and first roller.

8. The receiver described in claim 7 wherein:

said walls form a light-tight container which includes said rear wall, and also form a separate bracket which rotatably supports said pair of film engaging devices;

said container has a large aperture, said bracket can move to move said pair of film-engaging devices into and out of said aperture, and said container has a door which can close said aperture when said devices have moved out of it, whereby to enable film to be carried in a compact container.

* * * * *